(No Model.)
C. G. RUST.
ICE CREEPER.
No. 264,105. Patented Sept. 12, 1882.
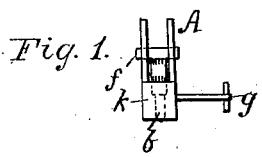
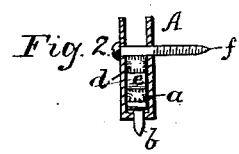
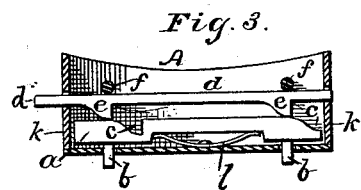
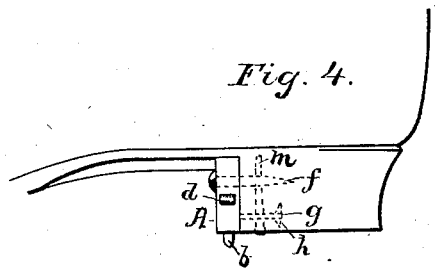
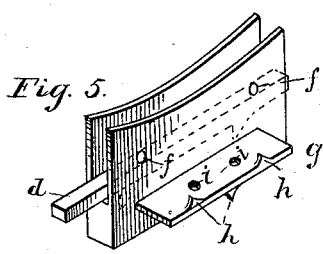
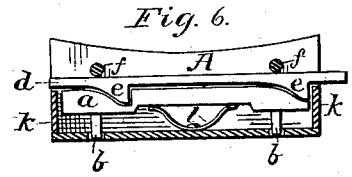
Witnesses:
Orville C. Rorabaugh
Geo. W. Hewitt
Inventor:
Charles G. Rust
By Wm. Zimmerman
Atty.

UNITED STATES PATENT OFFICE.

CHARLES G. RUST, OF CHICAGO, ILLINOIS.

ICE-CREEPER.

SPECIFICATION forming part of Letters Patent No. 264,105, dated September 12, 1882.

Application filed January 11, 1882. (No model.)

*To all whom it may concern:*

Be it known that I, CHARLES G. RUST, of Chicago, in the county of Cook and State of Illinois, have invented certain new and useful Improvements in Ice-Creepers; and I hereby declare the following to be a full, clear, and exact description thereof, which will enable others skilled in the art to which my invention relates to make and use the same, reference being had to the accompanying drawings, forming a part hereof, and in which—

Figure 1 represents an end view of my ice-creeper having the spur drawn in and a plate, *g*, attached. Fig. 2 represents the same with the end plate removed, showing both bars, and with the spurs projecting and without the plate *g*. Fig. 3 represents a side view of the same with the side removed, showing the entire internal mechanism in operating position. Fig. 4 is a side view of a heel with the ice-creeper attached. Fig. 5 is a perspective view of the ice-creeper from the rear side, with plate *g* and its spurs *h*. Fig. 6 represents Fig. 3 in inoperative position.

Like letters of reference indicate like parts.

The object of my invention is to produce an ice-creeper which can be permanently attached to the shoe, either when being manufactured or subsequently, and in which the spurs may be caused to project or not, at pleasure, by means of a longitudinally-reciprocating bar projecting beyond the ends of the box and provided with latches fitting into corresponding notches in the bar, provided with spurs, as shown, and without the inconvenience of stooping or soiling the hands.

In the drawings, A represents a narrow oblong metal box, reaching across the entire front of the heel, and open on top and partly on the ends, as seen in Figs. 1 and 3; or it may be entirely closed. To the bottom of said box is attached a spring, *l*, and upon it rests a bar, *a*, slightly notched, so as to make room for the spring, and on its upper side said bar is provided with notches *c*, into which fit the latches *e* of the bar *d*. The bar *d* rests upon the ends *k* of the box, and is prevented from rising by the pins *f* above it. To the rear side of the box is attached a plate, *g*, provided with two or more holes, *i*, as shown, and also with spurs *h*. The plate *g* is built into the heel, thus securely holding the box A in its place. The spurs *h*, with which it may be provided, if desired, being driven into the leather, tend to hold it in place; or it may be held by pins *m*, or both, or either alone. The plate *g* may also be dispensed with, and in place of the short pins screws *f* may be driven through the box A, which will serve both to hold it in its place and also as pins to hold the bars in place.

It will be observed that the spurs *b*, securely attached to the bar *a*, latches *e*, and pins *f* are in a line, one above the other, which will prevent any unnecessary strain on or weight of the bars *a* and *d*.

Midway between the latches *e* the bar *d* may be provided with a similar latch on its upper side, and which points in a reverse direction, over which a strap of proper length rides, and which is fastened to the bar *a*. Then the same motion which relieves the latches *e* into the notches *c* will engage in the strap, and so lift the bar *a*.

To operate this ice-creeper the bar *d* is simply shoved back and forth longitudinally. When not in use, as shown in Fig. 6, the projecting end of the bar *d* is struck or pushed inward as far as it will go. This causes the latches *e* to slide out of the notches *c*, and thus depress the bar *a*, so that the spurs *b* will project, as shown in Fig. 3. This may be done by striking the heel sidewise against any solid, or against the sole of the other foot. As constructed, the weight thrown upon the spurs *b* is carried by the pins or screws *f*.

The bar *d* may be held in its place by the walls *k* above it and answer in place of the pins *f;* but the bar *d* would have to be subjected to greater strain, as before stated, and therefore be made heavier, and the box A may be held in its place entirely by the plate *g*.

What I claim is—

1. In an ice-creeper, the notched bar *a*, provided with spurs *b*, in combination with the bar *d*, provided with latches *e*, adapted to fit into the notches of the bar *a*, spring *l*, and pins *f*, constructed substantially as specified.

2. In an ice-creeper, the box A, provided with a vertically-operating bar extending through its entire length, and provided with spurs *b*, pins *f*, and a longitudinally-reciprocating bar, *d*, provided with mechanism, substantially as described, whereby said spurs are held in or withdrawn from the operating position, substantially as specified.

CHARLES G. RUST.

Witnesses:
WM. ZIMMERMAN,
GEO. W. HEWITT.